United States Patent Office 3,264,367
Patented August 2, 1966

3,264,367
POLYMERIZATION CATALYST AND PROCESS OF POLYMERIZATION USING SAID CATALYST
Robert Chalmers Pitkethly and Anthony George Goble, both of Sunbury-on-Thames, Middlesex, England, assignors to The British Petroleum Company Limited, London, E.C. 2, England, a British joint-stock corporation
No Drawing. Filed Oct. 15, 1963, Ser. No. 316,455
Claims priority, application Great Britain, Nov. 2, 1962, 41,359/62
8 Claims. (Cl. 260—683.15)

This invention relates to a polymerization catalyst and to a process of polymerization using said catalyst.

According to one aspect of the present invention there is provided a catalyst, suitable for use in effecting polymerization reactions, comprising a mixture of (a) a reducing agent and (b) a product obtained by contacting at elevated temperature a halogenated organic compound, preferably a halogenated compound of methane containing more than one halogen atom, with (i) an oxide of a metal of Group IVa, Va or VIa of the Periodic Table, or alumina, or (ii) a mixture of two or more compounds of class (i), or (iii) a compound obtained or obtainable by the reaction of two or more compounds of class (i).

Before use, the catalyst will usually be subjected to conditions such that reaction of the reducing agent, with the compound of class (i), (ii) or (iii), takes place.

According to another aspect of the present invention there is provided a process for the production of a catalyst, suitable for use in effecting polymerization reactions which comprises contacting a material of class (i), (ii) or (iii) as hereinbefore defined with a chlorinated organic compound, preferably a chlorinated compound of methane containing more than one chlorine atom, at elevated temperature and thereafter treating the product so obtained with a reducing agent under conditions which effect a reduction in the valency state of the metal.

Suitable reducing agents include aluminum; metals of Group IVa, Group Va, or VIa, VIIa and VIII, for example titanium; hydrogen; and organic reducing agents, for example hydrazine and unsaturated hydrocarbons.

The oxide of a metal of Group IVa, Va or VIa (which, with alumina, constitutes oxides of class (i)) may be selected from the oxides of Ti, Zr, Hf, Th, V, Nb, Ta, Cr, Mo, W and U. The preferred oxide is titania.

A mixture of the class (i) oxides may be formed by mechanical mixing. If desired one oxide may be deposited on another oxide or two or more oxides may be co-precipitated.

Preferably an oxide of a metal of Group IVa, Va or VIa is co-precipitated with alumina. Suitably when said oxide is titania, precipitation is effected from a mixture of an alkyl titanate and an aluminum alkoxide. Preferably the mixture is used in the form of a solution in a diluent, suitably a hydrocarbon, for example benzene. Suitably as the precipitating agent there is used an aqueous medium and preferably there is used, for this purpose, de-ionised water. Suitably the oxides selected from alumina and the oxides of the Group IVa, Va or VIa metal are employed or co-precipitated in molar proportions in the range 100:1 to 1:100.

When the metal oxides are co-precipitated by means of water the product will usually be hydrated. In general it will be ncessary to calcine the product at such a temperature that the resulting activated oxides still contain a small amount of hydrogen usually less than 1% wt. For example, a suitable calcination is for 1 hour at 500° C. This residual hydrogen is generally considered to be in the form of surface hydroxyl groups, and it is believed that the chlorine compound reacts with the surface hydroxyl groups to form active catalyst sites. Water is, in fact, a product of the reaction, but preferably not all the hydrogen is removed and the treated catalyst still contains a measurable quantity of hydrogen.

Suitable chlorinated compounds, used for the treatment of the metal oxides, include methylene dichloride, chloroform and carbon tetrachloride. The amount of chlorine added to the oxide catalyst is preferably within the range 1 to 15% wt. The precise amount will usually be determined according to the surface area, for example as measured by low temperature nitrogen absorption. Other things being equal, the greater the surface area the greater is the amount of chlorine taken up, and the greater is the activity of the catalyst. Preferably therefore, the oxide should have a high surface area.

Preferably treatment of the metal oxide or metal oxides will be carried out using the chlorinated compound in vapour phase, suitably in an inert gas carrier. If desired the metal oxide or oxides may be pre-heated before contact with the chlorine containing compound. In general the treatment will be carried out at elevated temperatures within the range 200° F.–1100° F. (93°–593° C.); however, higher or lower temperatures may also be used. In general treatment will be discontinued before a metal chloride is liberated and such conditions will of course depend on the individual oxide system and chlorine compound used. For example, with titania or titania-alumina, and carbon tetrachloride as chlorinating agent, a suitable treatment temperature lies in the range 100–300° C. In general the desirable amount of treatment can be determined on the basis of a prior experimental run, measuring for example, the time of treatment or the up-take of chlorine up to the point at which metal chloride is just liberated.

It is believed that under conditions of treatment such that treatment is terminated before metal chloride is liberated, the chlorine is bonded to metal atoms constituting part of a solid catalyst surface.

The catalyst hereinbefore described will in general be maintained after formation under a blanket of dry inert gas, for example dry nitrogen.

According to another aspect of the present invention there is provided a process which comprises polymerizing a polymerizable organic compound in the presence of a catalyst as hereinbefore described.

Within the term "polymerizing" we include co-polymerizing, interpolymerizing, graft polymerizing and block polymerizing.

Polymerizable compounds which may be employed include mono-, di- and poly-olefins, acetylenes and organic compounds containing a functional group and an olefinic and/or acetylenic linkage. A particularly suitable class of compounds are the alpha olefins of general formula R—CH=CH$_2$ where R is an alkyl, cycloalkyl or aryl group. Particularly suitable polymerizable compounds are ethylene, propylene, butene-1, 4-methylpentene-1, butadiene, isoprene and styrene.

Polymerization may be carried out batchwise or continuously using, for example, a fixed bed, moving bed or suspended catalyst. Preferably the reaction will be carried out in the presence of a diluent. Suitably the diluent will be a solvent for at least part of the product.

The invention is illustrated by but not limited with reference to the following examples.

*Example 1*

A titania catalyst base was prepared as follows:
340 grams of tetra-normal-butyltitanate, dissolved in 2 litres of dry benzene, were hydrolysed with 1 litre of de-ionized water, and stirred for 2 hours. After centrifuging, the gel was washed repeatedly with de-ionised water, dried at 120° C. in an air oven (16 hours) and roasted in air at 400° C. for 1 hour. The yield of titania was 77 grams.

A titania-alumina base was prepared as follows:

170 grams of tetra-normal-butyltitanate and 204 grams of aluminum isopropoxide, dissolved in 2 litres of dry benzene were hydrolysed with 1 litre of de-ionised water. After centrifuging, the gel was washed repeatedly with de-ionised water, dried at 120° C. in an air oven (16 hours) and roasted in air at 400° C. for 1½ hours. The yield of titania-alumina was 120 grams (before roasting at 400° C.).

Each of the above described catalyst bases was halogenated in the following manner:

10 ml. of catalyst base (12–16 mesh or 18–44 mesh) were flushed with dry nitrogen for 15 mins. at 100 ml./min. in a reactor at the chlorination temperature. The nitrogen stream was then diverted to bubble through the chlorinating agent and over the catalyst base for various times or until titanium tetrachloride fumes appeared. The catalyst was then swept with nitrogen and allowed to cool.

A sample of the halogenated titania and the halogenated titania-alumina were then mixed with finely ground aluminum powder.

4-methylpentene-1 was then polymerized under the following conditions:

1–2 grams of the catalyst were placed in a dried flask under an atmosphere of nitrogen and to it added 10 ml. of 4-methylpentene-1 dissolved in 10 ml. n-heptane. The mixture was refluxed for 2 hours at the end of which time the polymers were extracted with boiling n-heptane.

The results set out in the following Table 1 were obtained:

TABLE 1

| Catalyst Base | Chlorination | Cl Content, Percent wt. | Al Addition, Percent | Polymer Yield g./g./cat. | Polymer Inspection |
|---|---|---|---|---|---|
| $TiO_2$ | $CCl_4$, 176–195° C | 5.5 | Nil | 1.92 | Low viscosity oil, ($C_{12-30}$). |
| $TiO_2$-$Al_2O_3$ | $CCl_4$, 171–191° C | 6.62 | Nil | 1.80 | Low viscosity oil, $C_nH_{2n}(C_{12-36})$. |
| $TiO_2$ | $CCl_4$, 176–195° C | 5.5 | 6 | 2.07 | Low viscosity oil, $C_nH_{2n}(C_{12-36})$.*1 |
| $TiO_2$-$Al_2O_3$ | $CCl_4$, 171–191° C | 6.62 | 4 | 2.03 | Do. |
| $TiO_2$ | $CHCl_2CH_3$, 171–179° C | 1.22 | 2 5 | 0.31 | Do. |

1 Viscosity at 100° F.=65.6 cs.
2 Al heated with chlorinated titania at 300° C. for 1 hr. in $N_2$.

*Example 2*

The procedure of Example 1 was repeated except that differing periods of chlorination and various metals were employed as an alternative to aluminum and polymerization was effected at room temperature employing 10 ml. 4-methylpentene-1 dissolved in 50 ml. n-heptane, under an atmosphere of hydrogen.

The results set out in the following Table 2 were obtained:

TABLE 2

| Catalyst Base | Chlorination | Cl Content, percent wt. | Metal Additive | Polymer Yield, g./g./cat. | Polymer Inspection |
|---|---|---|---|---|---|
| $TiO_2$ | $CCl_4$, 175° (16 min.) | 2.70 | Al (4%) | 0.58 | Viscous oil, $C_nH_{2n}C_{12-42}$. |
| $TiO_2$ | $CCl_4$, 175° (16 min.) | 2.70 | Mg (15%) | 0.93 | Do. |
| $TiO_2$ | $CCl_4$, 180°–208° (6 min.) | 1.1 | Zn (29%) | 0.22 | Very viscous, $C_nH_{2n}C_{12-42}$. |
| $TiO_2$ | $CCl_4$, 180°–208° (6 min.) | 1.1 | Fe (25%) | 0.22 | Do. |
| $TiO_2$-$Al_2O_3$ | $CCl_4$, 270° (5 min.) | 5.3 | Al (18%) | 0.76 | Viscous oil, $C_nH_{2n}C_{12-48}$. |
| $TiO_2$-$Al_2O_3$ | $CH_2Cl_2$, 270° (10 min.) | 4.3 | Al (27%) | 0.78 | Do. |

*Example 3*

The procedure of Example 2 was again employed except that scrupulous care was taken to avoid contamination of the chlorinated catalyst and the apparatus with air or water vapour.

The results set out in the following Table 3 were obtained:

TABLE 3

| Catalyst Base | Chlorination | Cl Content, percent wt. | Metal Additive | Polymer Yield, g./g./cat. | Polymer Inspection |
|---|---|---|---|---|---|
| $TiO_2$ | $CCl_4$, 240–253° (8 min.) | 5.65 | Al (2%) | 0.28 | Semi-solid. |
| $TiO_2$ | $CCl_4$, 186–200° (8 min.) | 5.6 | Al (17%) | 0.16 | Do. |
| $TiO_2$ | $CCl_4$, 174° (7 min.) | 5.55 | Zn (17%) | 0.12 | Do. |
| $TiO_2$ | $CH_2Cl_2$, 224° (8 min.) | 3.95 | Al (5%) | 0.91 | Viscous oil, $C_{12-48}$. |

We claim:

1. A process for the production of a catalyst, suitable for use in effecting polymerization reactions, which comprises contacting, at a temperature in the range of 93–593° C., a chlorinated compound of methane selected from the group consisting of methylene dichloride, chloroform and carbon tetrachloride with an oxide of a metal selected from the group consisting of titania and mixtures of titania and alumina such that chlorine is taken up by the oxide in an amount of 1–15% by weight without the production of free chloride, and thereafter treating the product so obtained with a metal reducing agent selected from the group consisting of aluminum, zinc, iron and magnesium under conditions which effect a reduction in the valency state of the metal of the metal oxide compound.

2. A process according to claim 1 in which the metal oxide is titania.

3. A process according to claim 1 in which the metal oxide is a mixture of titania and alumina.

4. A process according to claim 1 in which the chlorinated organic compound is carbon tetrachloride.

5. A process according to claim 1 in which the chlorination of the metal oxide is carried out at a temperature in the range 100°–300° C.

6. A catalyst suitable for use in effecting polymerization reactions comprising the reaction product of (a) a metal reducing agent selected from the group consisting of aluminum, zinc, iron and magnesium and (b) a product obtained by contacting at a temperature in the range of 93–593° C. a chlorinated compound of methane selected from the group consisting of methylene dichloride, chloroform and carbon tetrachloride with an oxide of a metal selected from the group consisting of titania and mixtures of titania and alumina such that chloride is taken up by the oxide in an amount of 1–15% by weight without the production of free chloride.

7. A process which comprises polymerizing an alpha mono-olefinic hydrocarbon by contacting said hydrocarbon at a temperature in the range of ambient–200° C. with a catalyst as claimed in claim 6.

8. A process according to claim 7 in which the mono-olefinic hydrocarbon is selected from the group consisting of ethylene, propylene, butene-1 and 4-methyl pentene-1.

References Cited by the Examiner

UNITED STATES PATENTS 2,830,106   4/1958   Good et al. _____ 260—683.15
3,112,351   11/1963  Hoekstra _____ 260—683.15

FOREIGN PATENTS 1,299,388   6/1962   France.

DELBERT E. GANTZ, *Primary Examiner.*

R. H. SHUBERT, *Assistant Examiner.*